(12) United States Patent
Nancollis et al.

(10) Patent No.: US 11,209,118 B2
(45) Date of Patent: Dec. 28, 2021

(54) SUPPORT AND STABILIZATION SYSTEMS

(71) Applicant: MOTION IMPOSSIBLE LTD, Bristol (GB)

(72) Inventors: Andrew Nancollis, Veston super Mare (GB); Robert Drewett, Tetbury (GB)

( * ) Notice: Subject to any disclaimer, the term of this patent is extended or adjusted under 35 U.S.C. 154(b) by 0 days.

(21) Appl. No.: 16/756,870

(22) PCT Filed: Nov. 13, 2018

(86) PCT No.: PCT/GB2018/053276
§ 371 (c)(1),
(2) Date: Apr. 17, 2020

(87) PCT Pub. No.: WO2019/097218
PCT Pub. Date: May 23, 2019

(65) Prior Publication Data
US 2021/0190258 A1 Jun. 24, 2021

(30) Foreign Application Priority Data
Nov. 16, 2017 (GB) ...................................... 1718935

(51) Int. Cl.
*F16M 11/14* (2006.01)
*B63B 79/10* (2020.01)
(Continued)

(52) U.S. Cl.
CPC ............. *F16M 11/14* (2013.01); *B60R 11/04* (2013.01); *B63B 79/10* (2020.01); *B64D 47/08* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS

2008/0303900 A1* 12/2008 Stowe .................... F16M 11/10
348/143
2010/0224745 A1 9/2010 Orlov et al.
(Continued)

FOREIGN PATENT DOCUMENTS

DE 2105241 A1 8/1972

OTHER PUBLICATIONS

O. Atesoglu and M. K. Ozgoren, "The stabilization controller design for a tripod type parallel manipulator used for active suspension of a delicate device," 2008 IEEE International Conference on Control Applications, 2008, pp. 1239-1246, doi: 10.1109/CCA.2008.4629608.

*Primary Examiner* — Clayton E. LaBalle
*Assistant Examiner* — Kevin C Butler
(74) *Attorney, Agent, or Firm* — Smartpat PLC

(57) ABSTRACT

A stabilization system (6) comprises a base for attachment to a first object (2), a telescopic element having a first portion rotatably engaged with the base, and a second portion linearly slidably engaged with the first portion. The second portion has an attachment portion adapted for reception of a second object (1). The system includes plurality of linear actuators, each linear actuator having a first portion rotatably engaged with the base, and a second portion linearly slidably engaged with the first portion of the actuator concerned, and rotatably engaged with the second portion of the telescopic element. Each linear actuator is operable to drive the second portion thereof linearly with respect to the first portion thereof.

20 Claims, 6 Drawing Sheets

(51) Int. Cl.
| | |
|---|---|
| *B60R 11/04* | (2006.01) |
| *B64D 47/08* | (2006.01) |
| *G03B 17/56* | (2021.01) |
| *F16M 11/12* | (2006.01) |
| *F16M 11/10* | (2006.01) |
| *F16M 11/18* | (2006.01) |
| *F16M 11/04* | (2006.01) |
| *B60R 11/00* | (2006.01) |

(52) U.S. Cl.
 CPC ............. *F16M 11/04* (2013.01); *F16M 11/10* (2013.01); *F16M 11/12* (2013.01); *F16M 11/18* (2013.01); *G03B 17/561* (2013.01); *B60R 2011/004* (2013.01); *B60R 2011/008* (2013.01)

(58) Field of Classification Search
 USPC .......................................................... 396/428
 See application file for complete search history.

(56) References Cited

U.S. PATENT DOCUMENTS

| | | | |
|---|---|---|---|
| 2011/0163222 A1* | 7/2011 | Moser | G01S 3/7861 250/203.4 |
| 2012/0026467 A1* | 2/2012 | Chapman | F16M 11/18 352/243 |
| 2016/0004232 A1* | 1/2016 | Russo | F16M 11/24 700/275 |
| 2018/0023751 A1* | 1/2018 | Duan | F16M 11/10 108/4 |
| 2020/0072407 A1* | 3/2020 | Aharon | F16M 11/18 |

* cited by examiner

SUPPORT AND STABILIZATION SYSTEMS

TECHNICAL FIELD

The present invention relates to support and stabilization systems.

BACKGROUND OF THE INVENTION

It is often desirable to mount an object, such as a camera, onto a support platform. In the case when the platform is stationary, such mounting presents no particular issues. However, when the support platform is movable, such as a on a vehicle, there are significant issues to be overcome in order to maintain the object in a stable condition. In the example of a camera, it is desirable to maintain the camera stable for providing images of a suitable quality. In particular, there are significant challenges presented by mounting a camera on a vehicle that traverses rough ground, on a water-borne vehicle, due to the ever-changing nature of the surface on which the vehicle and camera are supported. Similar issues occur with airborne vehicles, and affect mounting of other objects, such as sensor devices, or projection apparatus. In order to compensate for movement of the vehicle, systems have been proposed that make use of a complex arrangement of multi-axis gimbals and powered actuators.

However, such previous-considered designs have several drawbacks. Firstly, the support structures are cumbersome and heavy, which restricts the possible applications for the resulting system. Secondly, previously-considered designs are not able to maintain an object position with respect to an initial reference position. For example, previously-considered designs are not able to maintain the camera in a substantially fixed, or smoothly changing, vertical position with respect to the horizon in real time. Thirdly, previously considered designs are not suitable for wide angle image capture since the structure of the support restricts the angle of view.

It is, therefore, desirable to provide a support and stabilization system that seeks to address the issues of the previously-considered designs.

SUMMARY OF THE INVENTION

Aspects of the present invention are set out in the attached claims.

According to an aspect of the present invention, there is provided a support and stabilization system comprising a base for attachment to a first object; a telescopic element having a first portion rotatably engaged with the base, and a second portion linearly slidably engaged with the first portion and having an attachment portion adapted for reception of a second object; a plurality of linear actuators, each linear actuator having a first portion rotatably engaged with the base, and a second portion linearly slidably engaged with the first portion of the actuator concerned, and rotatably engaged with the second portion of the telescopic element, each linear actuator being operable to drive the second portion thereof linearly with respect to the 5 first portion thereof.

In one example, the first portion of the telescopic element is rotatably engaged with the base by a first rotational bearing element.

In one example, the first portion of each linear actuator is rotatably engaged with the base by a second rotational bearing element.

In one example, the second portion of each linear actuator is rotatably engaged with the second portion of the telescopic element by a third rotational bearing element.

In one example, the first bearing element is chosen from a group including multi-axis pivot, a gimbal, a two-pivot joint, a ball joint, and a flexible resilient member.

In one example, the second bearing element is chosen from a group including multi-axis pivot, a gimbal, a two-pivot joint, a ball joint, and a flexible resilient member.

In one example, the third bearing element is chosen from a group including multi-axis pivot, a gimbal, a two-pivot joint, a ball joint, and a flexible resilient member.

In one example, the base is provided by a substantially planar base portion.

In one example, the telescopic element defines a longitudinal axis of the system, and the linear actuators define respective actuator longitudinal axes, which are arranged to extend from the base towards the longitudinal axis of the system.

In one example, the linear actuators are engaged with the second portion of the telescopic element at substantially the same axial position on that second portion.

One example system comprises three such linear actuators.

One example system comprises four such linear actuators.

One example system further comprises a control unit operable to receive sensor data relating to a position of the attachment element, and to supply control signals to the linear actuators in response to reception of such sensor data, thereby to control the relative linear positions of the second portions of the linear actuators with respect to the first portions of the respective linear actuators.

In one example, the control unit is operable to control the linear actuators so as to maintain the linear and angular position of the attachment element with respect to a predetermined reference.

In one example, the predetermined reference is a horizon.

In one example, the control unit is operable to maintain the attachment element at a predetermined height with respect to the predetermined reference.

In one example, the first object is a vehicle. The vehicle may be one of a wheeled vehicle, a tracked vehicle, and a water-borne vehicle.

In one example, the second object is a camera device, an image recording device, or a video or film camera device.

DETAILED DESCRIPTION

Figure 1:
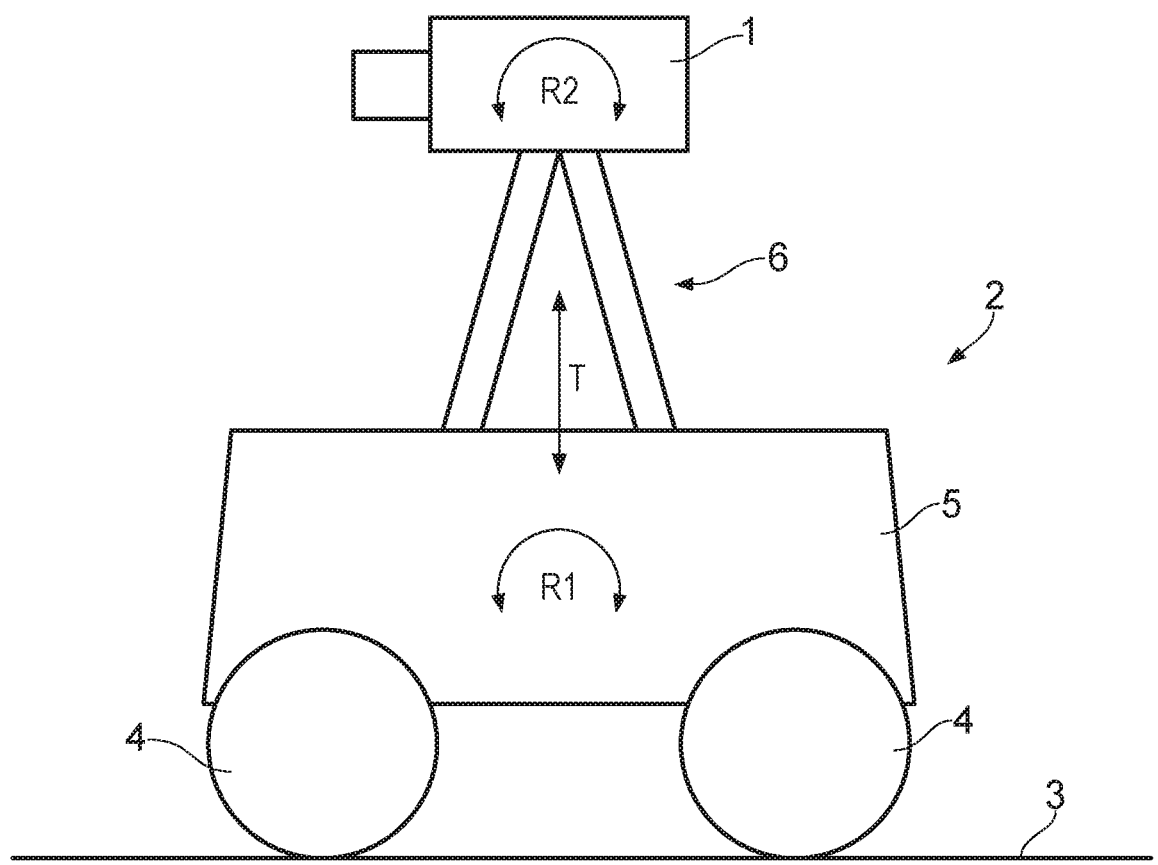
FIGS. 1 and 2 are schematic side and end illustrations respectively of an object mounted on a platform.
Figure 2:
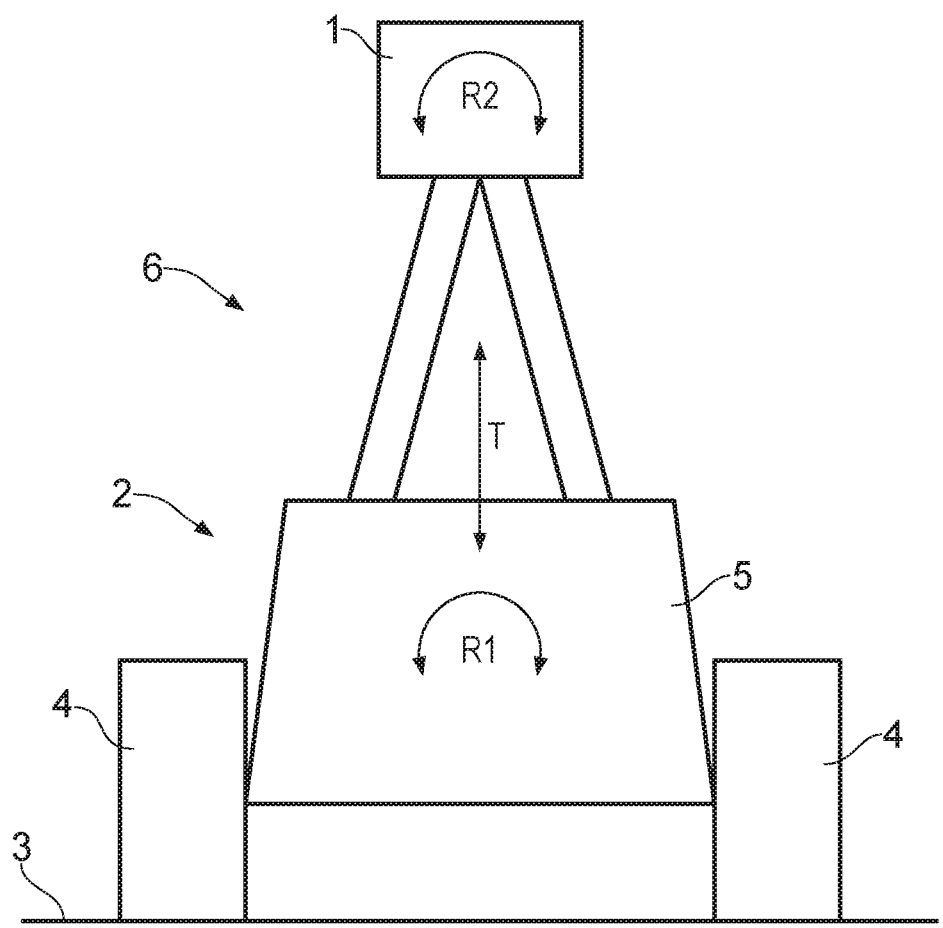

FIGS. 1 and 2 illustrate mounting of an object 1 on a platform 2 in accordance with the principles of the present invention. In the example of FIGS. 1 and 2, the platform 2 is illustrated as a moveable wheeled vehicle 2, and the object is an image capture device, such as a camera 1. It will be readily appreciated that the object 1 and platform 2 are not limited to these examples, which are used for clarity of description below. The principles of the present invention are applicable to the support and stabilization of any appropriate object, on any appropriate platform. The object and platform may be of any appropriate scale and size. The object may be supported by another stabilization platform if required.

In the example of FIGS. 1 and 2, the wheeled vehicle 2 has a plurality of ground engaging wheels 4 mounted on a chassis 5. The wheels 4 engage a ground surface 3 and, as is well known and understood, enable the vehicle 2 to move across the ground surface 3. A support and stabilization system 6 is mounted on the chassis 5, and the camera 1 is mounted on the support 6. It will be appreciated that the support and stabilization system 6 is illustrate schematically in FIGS. 1 and 2 for the sake of clarity of these drawings.

The support and stabilization system 6 enables the camera 1 to be supported above the chassis 5 of the vehicle 2, such that the size of the support and stabilization system 6 is small or non-existent in images generated by the camera 2. In particular, a support and stabilization system 6 embodying the principles of the present invention is mountable within the footprint of the vehicle 2 or another platform. As will be described in more detail below, the support and stabilization system 6 extends above the chassis 5 sufficiently to enable the camera to capture images that do not include the chassis 5 or support and stabilization system 6, or that contain a minimal view of those components. In addition, the support and stabilization system 6 is designed to have a small footprint such that wide-angle image capture, such as 360° capture, does not result in the chassis 5 or support and stabilization system 6 being seen significantly in the resulting images.

As the vehicle 2 moves across the ground surface 3, the chassis 5 experiences vertical translation T (i.e., translation substantially perpendicular to the ground surface 3), and rotation about a plurality of axes. Two such axes are illustrated by arrows R1 and R2 in the Figures. The support and stabilization system 6 is arranged to enable the camera 1 to be maintained in a desirable position relative to the ground surface 3, and to an initial reference position. Where the amount of translation and/or rotation of the vehicle 2 exceeds the amount of compensating movement available to the support and stabilization system 6, then 30 the system 6 serves to smooth out such movements, such that the positional changes of the camera 1 are typically slower than the positional changes of the vehicle 2.

The camera 1 may be mounted on the support and stabilization system 6 using a movable mount to allow the camera to be rotated (about one or more axes) with respect to the support and stabilization system 6.

Figure 3:
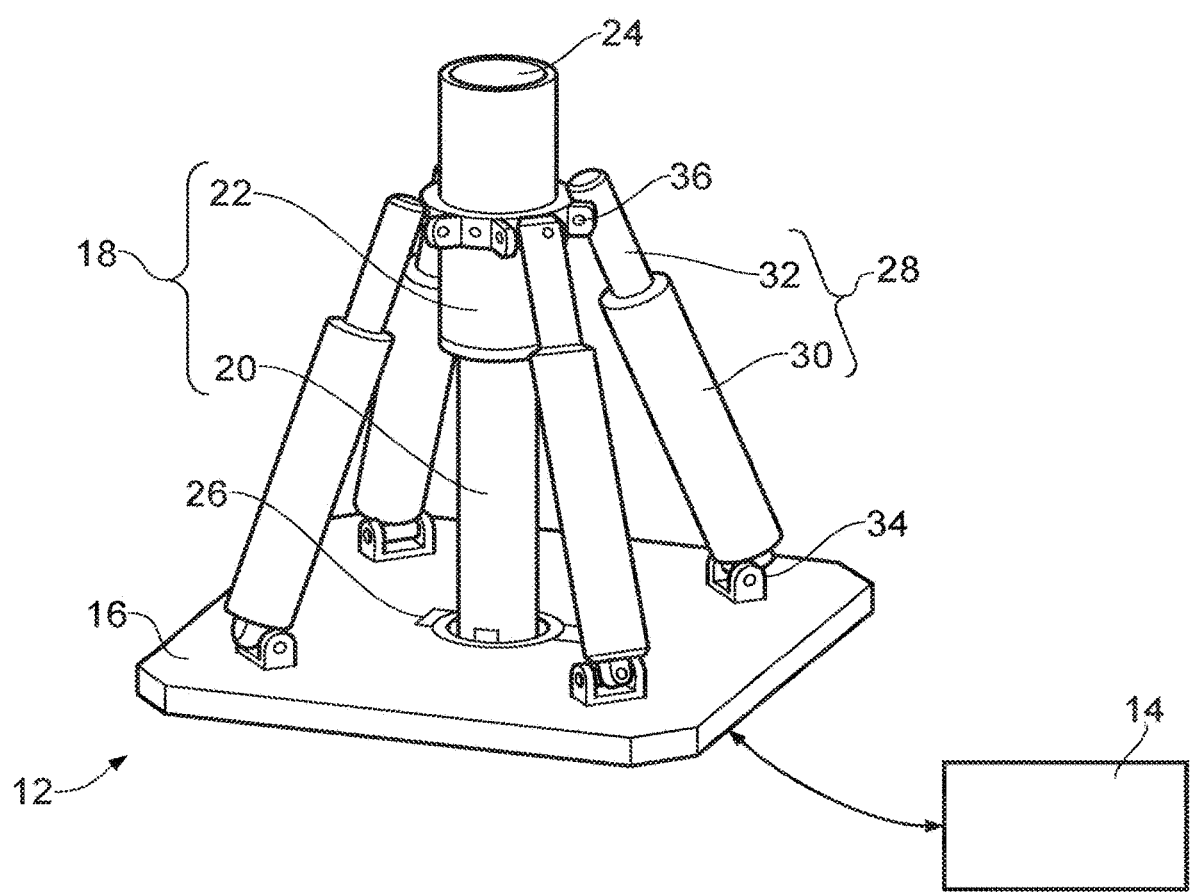
FIG. 3 is a schematic illustration of a support and stabilization system embodying the present invention.

FIG. 3 illustrates a support and stabilization system 10 embodying the present invention. The system 10 comprises a support and stabilization system 12 and a control unit 14. The support and stabilization system 12 will be referred to as the "support 12" in the following description. The control unit 14 is illustrated as being separate from the support 12, but it will be readily appreciated that the control unit may be located in any convenient position.

The support 12 comprises a base 16 for attachment to a first object, for example the vehicle or other support object. The base 16 is preferably provided by a substantially planar base portion. The base 16 is preferably of a substantially rigid material. A telescopic element 18 is mounted on the base 16 and defines a longitudinal axis of the system 10. The telescopic element 18 has a first portion 20 rotatably engaged with the base 16, and a second portion 22 linearly slidably engaged with the first portion 20. The second portion 22 of the telescopic element 18 defines an attachment portion 24 adapted for reception of a second object, for example a camera or other device. The second object may be attached directly to the attachment portion or may be attached via a secondary stabilization platform or system.

In one example, the first portion 20 of the telescopic element 18 is attached to the base 16 by a multi-axis gimbal 26. The multi-axis gimbal 26 is centered on the longitudinal axis and enables the telescopic element 18 to rotate freely in any polar orientation with respect to the base 16, about the center of the gimbal 26, so as to provide the telescopic element 16 with a range of angular movement with respect to the base 16. In a neutral position, as shown in FIG. 3, the telescopic element 18 extends substantially perpendicularly with respect to the substantially planar base 16.

The support 12 further comprises a plurality of linear actuators 28; in the example of FIG. 3, four linear actuators 28 are shown. Preferably, at least three linear actuators 28 are provided. The linear actuators 28 may be electrical (for example driven by a motor or other 25 electrical component), hydraulic, or pneumatic.

Each linear actuator 28 has a first portion rotatably engaged with the base 16, and a second portion 32 linearly slidably engaged with the first portion 30 of the actuator 28 concerned. The second portion 32 of each linear actuator 28 is rotatably engaged with the second portion 22 of the telescopic element 18. The linear actuators 28 define respective longitudinal axes, and each linear actuator 18 is operable to drive the second portion 32 thereof linearly along its longitudinal axis with respect to the first portion 30 thereof. Accordingly, extension and retraction of the second portions 32 of the linear actuators 28 causes the second portion 22 of the telescopic element 18 to move linearly with respect to the first portion 20, and rotationally with respect to the base 16 in a controlled manner.

The first portions 30 of the linear actuators 28 are attached to the base 16 by respective first two-axis pivoting joints 34. The second portions 32 of the linear actuators 28 are attached to the second portions 22 of the telescopic element 18 by respective second two-axis pivoting joints 36. In the example of FIG. 3, the second portions 32 of the linear actuators 28 are shown extending from inside the first portions 30. It will be readily appreciated that the opposite configuration is also possible, with the second portions 32 extending around the first portions 30. The first portions 30 of the linear actuators 28 may be attached to the planar base 16 or may be attached to the base 16 via suitable mounting portions.

Each of the first two-axis pivoting joints 34 allow the respective first portions 32 of the linear actuators 28 to rotate with respect to the base 16 about two axes. The first axis extends substantially parallel to the plane of the base 16, and the second axis extends substantially transversely to the longitudinal axis of the linear actuator 28 concerned.

Each of the second two-axis pivoting joints 36 allow the respective second portions 32 of the linear actuators 28 to rotate with respect to the respective second portions 32 of the telescopic element 18 about two axes. The first axis extends substantially tangentially to the respective second portion 32 of the telescopic element 18, and the second axis extends substantially transversely to the longitudinal axis of the linear actuator 28 concerned.

The linear actuators 28 may be electrically, hydraulically, or pneumatically actuated, and are controlled by the control unit 14. The control unit 14 is connected to receive sensor information and operates to use that sensor information to supply control signals to the linear actuators. This control of the linear actuators 28 adjusts the relative linear position of the second portions 32 with respect to the first portions 30 of the respective linear actuators, thereby controlling the linear and polar position of the telescopic element 18.

Sensors are provided on or in the support and stabilization system 6 and operate to provide the sensor information to the control unit. The sensors may be provided by any suitable combination of sensors. For example, a six-axis inertial measurement (IMU) may be provided. As is well known and understood, an IMU is an electronic device that measures and reports specific force, angular rate, and sometimes also the magnetic field surrounding an object, using a combination of accelerometers and gyroscopes, sometimes also magnetometers. Other possible sensors include a linear position sensor for the telescopic element 18 and/or for each linear actuator 28, an angular position sensor for the telescopic element 18, a multi axis accelerometer, a gravity sensor for determining a vertical direction, and an altimeter. Additional sensors and feedback devices may be provided on the vehicle or other platform for supplying additional information to the control unit 14. Furthermore, the control unit 14 may make use of additional information, such as positional information derived from Global Positioning System (GPS) data (or similar), for control of the support and stabilization system 6.

The control unit 14 operates to maintain the telescopic element 14 in a desired position and orientation relative to a predetermined reference, within the range of movement provided by the support and stabilization system 6. In this manner, the attachment portion can be maintained in a desired position and orientation with respect to the predetermined reference, thereby maintaining the camera 1 in a desired position and orientation. The predetermined reference may be internal to the vehicle 2 and support 12, or may be external to the system, such as the horizon.

Where the amount of translation and/or rotation of the vehicle 2 exceeds the amount of compensating movement available to the support and stabilization system 6, then the system 6 serves to smooth out such movements, such that the positional changes of the camera 1 are typically slower than the positional changes of the vehicle 2.

Preferably, the control unit 14 operates in real time in order to maintain the camera 1 in the desired position and orientation in real time. The system can then be described as "active" system.

This predetermined reference may be set upon initial calibration of the support and stabilization system 6. Following attachment of the camera 1 to the system 6, the user sets an initial position for the camera 1 and system 6 and calibrates the control system 14 in order to set the predetermined reference. For optimum performance, this initial calibration can also include mechanical balancing of the system 6.

Figure 4:
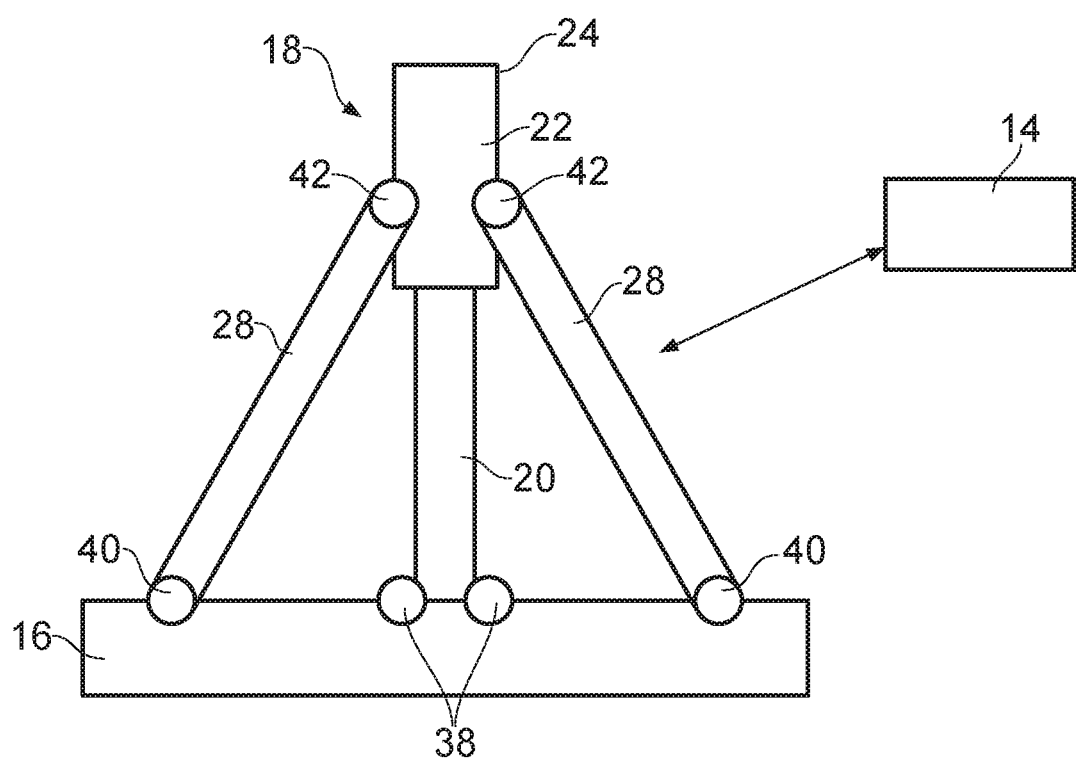
FIG. 4 is a simplified schematic side view of another support and stabilization system embodying the present invention.

FIG. 4 shows a simplified side view of another support and stabilization system embodying the present invention. The FIG. 4 embodiment is a generalized version of the FIG. 3 embodiment and is of the same overall structure. The FIG. 4 embodiment differs from the FIG. 3 embodiment by virtue of the general nature of the mounting rotational mounting of the telescopic element 18 and the linear actuators 28.

In FIG. 4, the first portion 20 of the telescopic element 18 is mounted on the base 16 by way of a first bearing element 38. The first bearing element 38 may be a multi axis pivot, such as a gimbal as in FIG. 3, a two-pivot joint, a ball joint, a flexible resilient member, or any other appropriate bearing element that allows the first portion 20 of the telescopic element 18 to rotate with respect to the base 16. Different first bearing elements 38 allow for different respective axes of rotation of the telescopic element. For example, a two-axis gimbal allows for rotation about two axes, each of which is substantially perpendicular to the longitudinal axis of the telescopic element 18. A ball joint would allow this $M^1 0$-axis rotation, and also allow for rotation of the telescopic element 18 about the longitudinal axis thereof.

Also illustrated in FIG. 4, respective second bearing elements 40 attach the linear actuators 28 to the base 16, and respective third bearing elements 42 attach the linear actuators 28 to the second portion 22 of the telescopic element 18. The second and third bearing elements 40 and 42 may be of the same type or may be of different types. The second and third bearing elements 40 and 42 may be provided by any suitable rotational element, such as a multi-axis pivot, such as a gimbal, a two-pivot joint, a ball joint, a flexible resilient member, or any other appropriate bearing element that allows the linear actuator 28 to rotate with respect to the base 16 and second portion 22 of the telescopic element 18.

Figure 5:
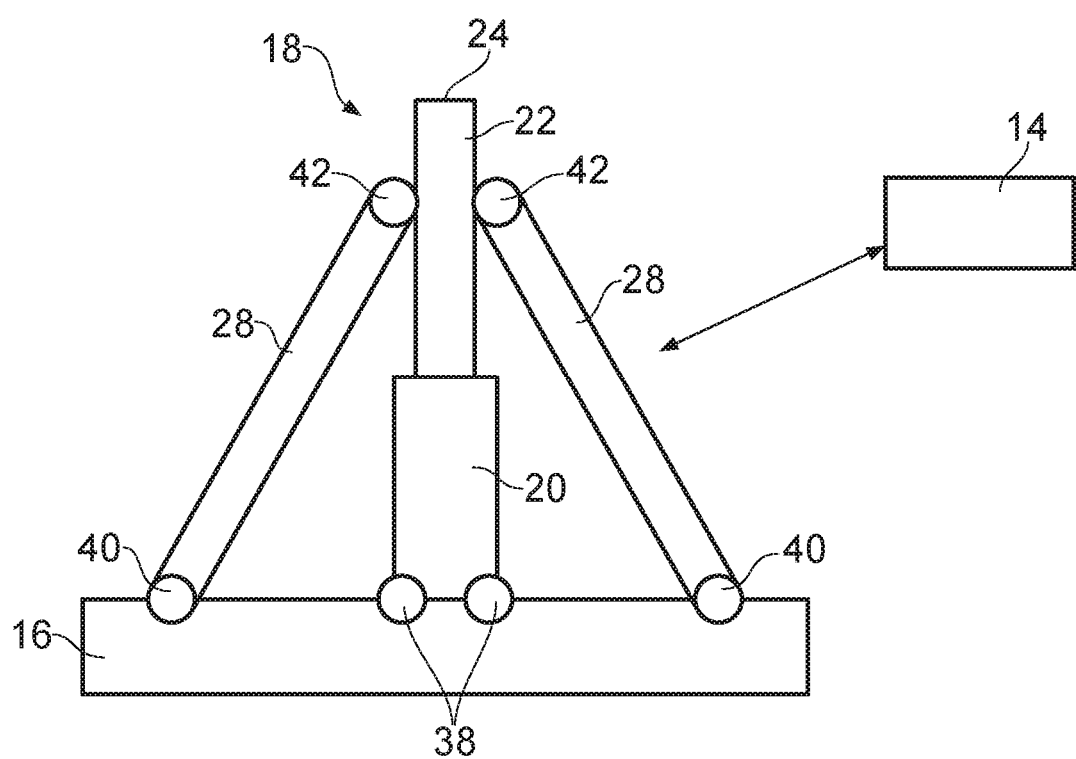
FIG. 5 is a simplified schematic side view of another support and stabilization system embodying the present invention.

In FIG. 4, the second portion 22 of the telescopic element 18 extends outside of first portion thereof. FIG. 5 illustrates the opposite situation in which the second portion 22 of the telescopic element 18 extends within the first portion 20 thereof. The remaining configuration and operation of the example of FIG. 5 is substantially the same as that for FIG. 4, with the same reference numerals used in each of FIGS. 4 and 5.

Figure 6:
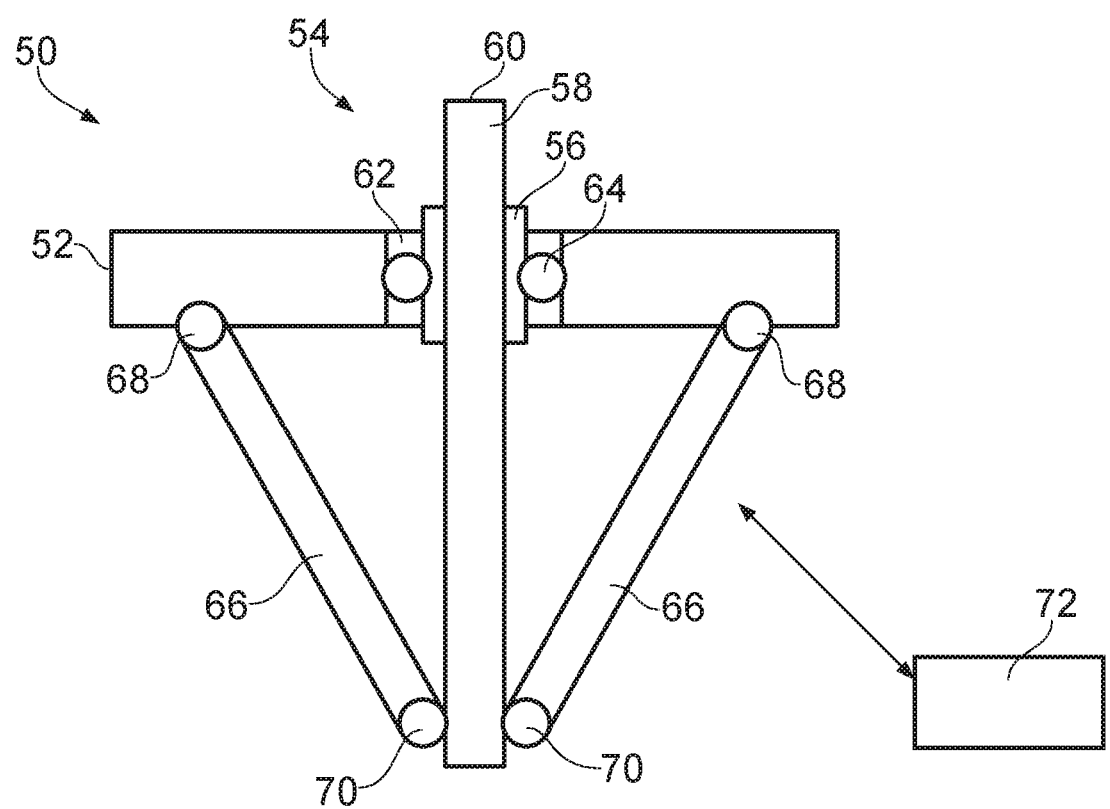
FIG. 6 is a simplified schematic partially cross-sectional side view of another support and stabilization system embodying the present invention.

FIG. 6 illustrates, in partial cross-sectional simplified schematic side view, another support and stabilization system embodying the present invention. The system of FIG. 6 is similar in overall concept to the embodiments shown in, and described with reference to, the previous Figures. In the example of FIG. 6, the linear actuators extend to a side of the base opposite to that of the attachment portion for the object being supported.

In FIG. 6, a support 50 comprises a base 52 for attachment to the platform. A telescopic element 54 extends through the base 52, through an aperture 62 defined in the base 52. The telescopic element 54 comprises a first portion 56, arranged for rotational engagement with the base 52, and a second portion 58 which extends through the first portion 56, and through the aperture 62 in the base 52. The second portion 58 of the telescopic element 54 is arranged for linear movement with respect to the first portion 56. The second portion of the telescopic element 54 provides an attachment portion 60 for the attachment of the object 30 to the support 50.

The first portion 56 of the telescopic element 54 is mounted on the base 52 by way of a first bearing element 64. The first bearing element 64 may be a multi axis pivot, such as a gimbal, a two-pivot joint, a ball joint, a flexible resilient member, or any other appropriate bearing element that allows the first portion 56 of the telescopic element 54 to rotate with respect to the base 52. Different first bearing elements 64 allow for different respective axes of rotation of the telescopic element. For example, a two-axis gimbal allows for rotation about two axes, each of which is substantially perpendicular to the longitudinal axis of the 5 telescopic element 54. A ball joint would allow this two-axis rotation, and also allow for rotation of the telescopic element 54 about the longitudinal axis thereof.

A plurality of linear actuators 66 are attached between the base 52 and the second portion 58 of the telescopic element 54. Respective second bearing elements 68 attach the linear actuators 66 to the base 52, and respective third bearing elements 70 attach the linear actuators 66 to the second portion 58 of the telescopic element 54. The second and third bearing elements 68 and 70 may be of the same type or may be of different types. The second and third bearing elements 68 and 70 may be provided by any suitable rotational element, such as a multi-axis pivot, such as a gimbal, a two-pivot joint, a ball joint, a flexible resilient member, or any other appropriate bearing element that allows the linear actuator 66 to rotate with respect to the base 52 and second portion 58 of the telescopic element 54.

A control unit 72 is provided and operates as the control unit described above.

The example system of FIG. 6 allows the object being supported to be closer to the base of the support system, whilst retaining the advantages of an embodiment of the present invention.

One particular example of the use of a support and stabilization system embodying the present invention would be mounting a camera 1 to the roof of a vehicle 2. The vehicle 2 can then drive over bumpy and angled terrain and the support and stabilization system is able to control the position the camera 1 such that, for example, the camera remains substantially level with respect to the horizon. The system is able to control the position of 25 the camera so as to remove or reduce any sudden vertical displacements or rotations that might create undesirable output from the camera 1.

If the base 16 is located at the center of the vehicle 2, the stabilizer system is able to reduce displacement as a result of the vehicle pitching or rolling.

Although FIGS. 1 and 2 illustrate a wheeled vehicle 2, it is to be understood that the principles of the present invention apply to any type of support vehicle or object. Examples of vehicles include wheeled vehicles, tracked vehicles, airborne and water borne vehicles. The support 12 may be attached directly to a vehicle or may be attached to any other piece of equipment. It will also be readily appreciated that a system embodying the principles of the present invention may be used to attach any first object to any second object. The description above relates to image capturing devices, such as cameras, but it will be readily appreciated that other devices may benefit from enhanced stability. For example, a support and stabilization system embodying the principles of the present invention may be used to provide a satellite antenna with a stabilized support. Other objects and systems requiring stabilized support may also benefit from a support and stabilization system embodying the principles of the present invention.

The invention claimed is:

1. A stabilization system comprising:
a base for attachment to a first object;
a telescopic element having a first portion rotatably engaged with the base, and
a second portion linearly slidably engaged with the first portion and having an attachment portion adapted for reception of a second object; and
a plurality of four or more linear actuators, each linear actuator having
a first portion rotatably engaged with the base, and
a second portion linearly slidably engaged with the first portion of the actuator concerned, and rotatably engaged with the second portion of the telescopic element,
each linear actuator being operable to drive the second portion thereof linearly with respect to the first portion thereof.

2. The stabilization system as claimed in claim 1,
wherein the first portion of the telescopic element is rotatably engaged with the base by a first rotational bearing element; and
wherein the first portion of the telescopic element is rotatably engaged with the base by a second rotational bearing element or wherein the second portion of each linear actuator is rotatably engaged with the second portion of the telescopic element by a third rotational bearing element.

3. The stabilization system as claimed in claim 2,
wherein the first bearing element is chosen from a group including multi-axis pivot, a gimbal, a two-pivot joint, a ball joint, and a flexible resilient member.

4. The stabilization system as claimed in claim 2,
wherein the second bearing element is chosen from a group including multi-axis pivot, a gimbal, a two-pivot joint, a ball joint, and a flexible resilient member.

5. The stabilization system as claimed in claim 2,
wherein the third bearing element is chosen from a group including multi-axis pivot, a gimbal, a two-pivot joint, a ball joint, and a flexible resilient member.

6. The stabilization system as claimed in claim 1,
wherein the base is provided by a substantially planar base portion.

7. The stabilization system as claimed in claim 1,
wherein the telescopic element defines a longitudinal axis of the system, and the linear actuators define respective actuator longitudinal axes, which are arranged to extend from the base towards the longitudinal axis of the system.

8. The stabilization system as claimed in claim 1,
wherein the linear actuators are engaged with the second portion of the telescopic element at substantially the same axial position on that second portion.

9. The stabilization system as claimed in claim 1,
comprising three such linear actuators.

10. The stabilization system as claimed in claim 1,
wherein the plurality of four or more linear actuators comprises more than four of the linear actuators.

11. The stabilization system as claimed in claim 1,
wherein the first object is a vehicle.

12. The stabilization system as claimed in claim 11,
wherein the vehicle is one of a wheeled vehicle, a tracked vehicle, an airborne vehicle, and a water-borne vehicle.

13. The stabilization system as claimed in claim 1,
wherein the second object is a camera device.

14. The stabilization system as claimed in claim 1,
wherein the second object is an image recording device.

15. The stabilization system as claimed in claim 1,
wherein the second object is a video or film camera device.

16. The stabilization system as claimed in claim 1,
wherein the second object is chosen from a group including a sensor device, a projection device, a light source device, an antenna, a directional antenna.

17. A stabilization system comprising:
a base for attachment to a first object;
a telescopic element having a first portion rotatably engaged with the base, and
a second portion linearly slidably engaged with the first portion and having an attachment portion adapted for reception of a second object;

a plurality of linear actuators, each linear actuator having
- a first portion rotatably engaged with the base, and
- a second portion linearly slidably engaged with the first portion of the actuator concerned, and rotatably engaged with the second portion of the telescopic element,
- each linear actuator being operable to drive the second portion thereof linearly with respect to the first portion thereof, and a control unit operable to receive sensor data relating to a position of the attachment portion, and to supply control signals to the linear actuators in response to reception of such sensor data, thereby to control the relative linear positions of the second portions of the linear actuators with respect to the first portions of the respective linear actuators, wherein the control unit is operable to control the linear actuators so as to maintain the linear and angular position of the attachment portion with respect to a predetermined reference.

18. The stabilization system as claimed in claim 17, wherein the predetermined reference is a horizon.

19. The stabilization system as claim in claim 17, wherein the control unit is operable to maintain the attachment portion at a predetermined height with respect to the predetermined reference.

20. The stabilization system as claimed in claim 17, wherein the control unit is operable to control the linear actuators so as to smooth movement of the attachment portion with respect to the base.

* * * * *